United States Patent
Lee et al.

(10) Patent No.: US 9,846,854 B1
(45) Date of Patent: Dec. 19, 2017

(54) SMART ELECTRONIC TRACKING TAGS WITH OPTIMIZED POWER CONSUMPTION

(71) Applicant: Amazon Technologies, Inc., Seattle, WA (US)

(72) Inventors: Sang Eun Lee, San Jose, CA (US); Jin Dong Kim, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/961,417

(22) Filed: Dec. 7, 2015

(51) Int. Cl.
*G06F 19/00* (2011.01)
*G06Q 10/08* (2012.01)
*G06K 19/077* (2006.01)

(52) U.S. Cl.
CPC ..... *G06Q 10/087* (2013.01); *G06K 19/07758* (2013.01)

(58) Field of Classification Search
CPC . G06Q 50/30; G06Q 10/087; G06K 19/07758
USPC ........................................................ 235/385
See application file for complete search history.

(56) References Cited

U.S. PATENT DOCUMENTS

| | | | | |
|---|---|---|---|---|
| 5,751,245 A | * | 5/1998 | Janky .................. | G01S 5/0027 340/993 |
| 2004/0207536 A1 | * | 10/2004 | Vet ....................... | G08B 21/22 340/8.1 |
| 2006/0033606 A1 | * | 2/2006 | Howarth ............... | G06K 17/00 340/10.1 |
| 2006/0145837 A1 | * | 7/2006 | Horton .................. | G06Q 10/08 340/539.13 |
| 2009/0273473 A1 | * | 11/2009 | Tuttle ................... | G06K 7/0008 340/572.1 |
| 2009/0303045 A1 | * | 12/2009 | Winter ................. | G06Q 10/08 340/568.1 |
| 2012/0252501 A1 | | 10/2012 | Smith et al. | |
| 2014/0089243 A1 | * | 3/2014 | Oppenheimer ....... | G06F 21/50 706/46 |
| 2016/0155084 A1 | * | 6/2016 | Mandanapu .......... | G06K 19/0701 705/333 |

\* cited by examiner

*Primary Examiner* — Laura Gudorf

(74) *Attorney, Agent, or Firm* — Eversheds Sutherland (US) LLP

(57) ABSTRACT

Systems, methods, and computer-readable media are disclosed for optimizing power consumption for smart electronic tracking tags. Example methods may include determining a destination address for a package, determining a shipping timeline for the package, the shipping timeline having a first segment and a second segment, and determining a transmission profile with a first frequency of package information data transmissions during the first segment and a second frequency of package information data transmissions during the second segment. Example methods may include sending the transmission profile to an electronic shipping tag associated with the package.

18 Claims, 9 Drawing Sheets

SMART ELECTRONIC TRACKING TAGS WITH OPTIMIZED POWER CONSUMPTION

BACKGROUND

Electronic tracking devices may be used to track a package location, for example, by transmitting information indicative of the package's location. Such electronic tracking devices may use portable power supplies, such as batteries, as a power source. Over time, the power source may deplete, and the electronic tracking device may be unable to send location information as a result. However, some of the location information sent by the electronic tracking devices may not be received by any computer system. For example, if location information is sent while the electronic tracking device is in a metal container, or while the electronic tracking device is in a basement, the location information may not be received due to interference. Accordingly, location information sent by the electronic tracking device that are not received waste the electronic tracking device's power supply and therefore reduce the operating lifetime of the electronic tracking device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
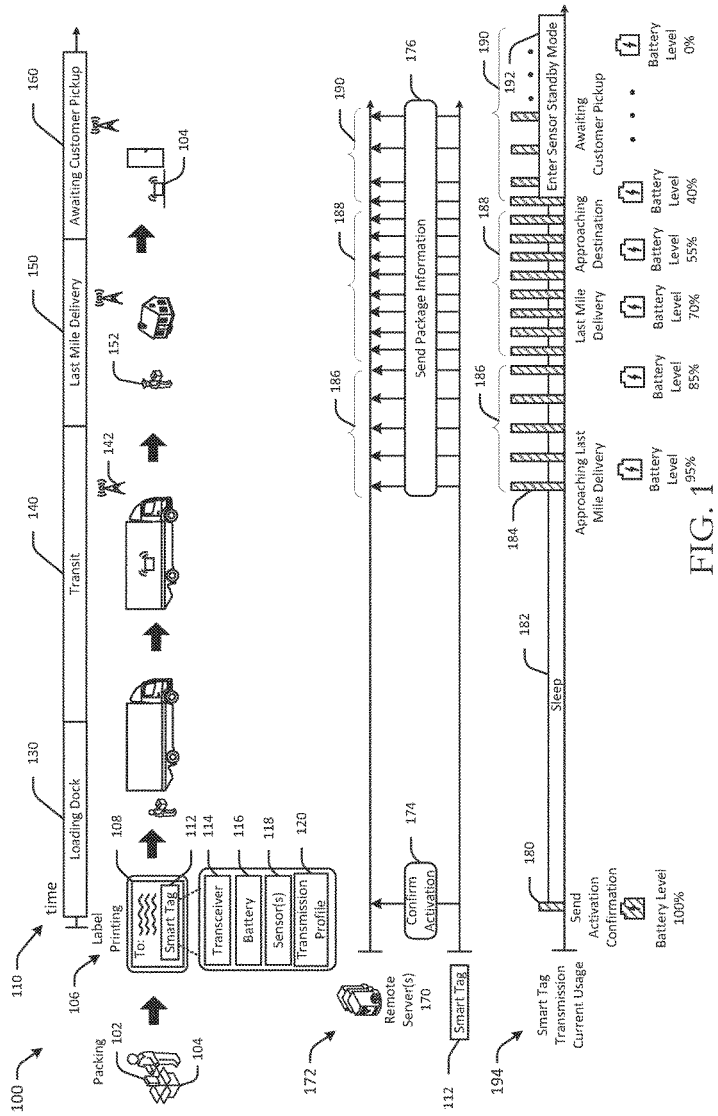
FIG. 1 is a schematic diagram of an example use case illustrating smart electronic tracking tags in accordance with one or more example embodiments of the disclosure.

This disclosure relates to, among other things, devices, systems, methods, computer-readable media, techniques, and methodologies for optimizing power consumption for smart electronic tracking tags. Smart electronic tracking tags or smart labels, as described herein, may be powered by batteries or other portable power sources with a limited amount of power. Smart electronic tracking tags may be radio frequency identification tags, near field communication tags, Bluetooth or Bluetooth LE tags, or any other suitable machine readable tag. Accordingly, the smart electronic tracking tags may have limited lifetimes, as measured by the amount of power or energy stored in the power source or energy storage device. Embodiments of the disclosure may optimize power consumption for smart electronic tracking tags so as to extend a lifetime of the power source that powers the smart electronic tracking tag, thereby extending an operational timeframe of the smart electronic tracking tag. Smart electronic tracking tags may be attached to or otherwise associated with packages or other items that are being shipped or sent from a first location to a second location. Smart electronic tracking tags of the disclosure may send information via, for example, an Internet of Things or other network, to one or more remote servers. The information sent by the smart electronic tracking tags may include package information, such as a unique package identifier, temperature information, location information, inertial information, orientation information, humidity information, or other collected or measured data associated with the package or item that the smart electronic tracking tag is associated with or attached to. Embodiments of the disclosure may generate shipping profiles or transmission profiles for packages or items that indicate a frequency at which the smart electronic tracking tag may send package information to the one or more remote servers. The transmission profiles may be based at least in part on an estimated shipping timeline, package or item type or category (e.g., perishable goods, valuable goods, etc.), and/or shipping route for the package or item associated with the smart electronic tracking tag. The smart electronic tracking tag may use the transmission profile to determine a frequency at which to send package information during different stages of transit (e.g., while at a loading dock, while in a shipping container, while at a customer's doorstep, etc.). The one or more remote servers may receive the package information from the smart electronic tracking tag and may determine a status of the package (e.g., whether the package is on time, whether the package is at an expected location, whether the package is damaged or likely to be damaged, whether the package has been opened, etc.). Depending on the package status, the one or more remote servers may generate notifications, such as a notification to a customer informing the customer that the package is delayed, or may generate an updated shipping profile or transmission profile, as described herein, that may be communicated to the smart electronic tracking tag and may adjust an initial shipping timeline based on the real-time package information received from the smart electronic tracking tag. For example, if the initial shipping timeline estimated a time of 12 hours until the package was at a delivery station for last mile delivery, and real-time package information indicates that the package is not at an expected location of the delivery station after 12 hours, but is 50 miles away, the initial shipping timeline may be adjusted to reflect an estimated time of 13 hours, or another length of time, from initial shipment until the package is at the delivery station for last mile delivery. Last mile delivery may be a status that indicates a package is within a predetermined distance or predetermined length of time away from a final destination. An updated transmission profile accounting for the updated shipping timeline may be communicated to the smart electronic tracking tag, and the smart electronic tracking tag may send package information at a transit frequency for an extra hour in this example.

Embodiments of the disclosure may generate transmission profiles for smart electronic tracking tags that indicate a frequency at which the smart electronic tracking tag should send package information. In certain embodiments, the smart electronic tracking tag may enter a sleep mode or a reduced power consumption mode in between package information data transmissions in order to conserve power supply and reduce power consumption. Transmission profiles generated by the disclosure may account for times during the shipping process during which transmissions sent by the smart electronic tracking tag may not be received, and may adjust a frequency of transmissions during those times. For example, if the package is estimated to be in a shipping trailer for 2 hours after the smart electronic tracking tag is activated, the frequency of transmission during the first 2 hours may be zero transmissions or zero transmissions per hour, or 1 transmission per hour. Accordingly, the power supply of the smart electronic tracking tag is not consumed or is minimally consumed during the time the package is in the shipping trailer when transmissions sent by the smart electronic tracking tag may not be received due to interference from the shipping trailer.

Referring to FIG. 1, an example use case for optimizing power consumption for smart electronic tracking tags is illustrated in accordance with one or more example embodiments of the disclosure. In the example of FIG. 1, an order fulfillment timeline 100 is depicted. A customer may order an item 102. The item 102 may be, for example, non-perishable or consumer goods, including electronics or other consumer goods, perishable goods such as food items, including grocery items or takeout foods, or another item. The customer may order the item 102 via a user device. The order may be communicated to a vendor via one or more wireless network(s). A vendor server may receive the order from the user device and may initiate fulfillment of the order. For example, an employee at a distribution center may pack the item 102 in a package 104 destined for the customer that placed the order. Once the item 102 is packed in the package 104, or while the item 102 is being packed and/or the order is filled, the example order fulfillment timeline 100 includes label printing 106. Label printing 106 may include printing a label 108 for placement on the package 104. The label 108 may include a human and/or machine readable indication of a destination for the package 104. For example, the label 108 may include a destination address, a scannable barcode, a radio frequency identification (RFID) tag, or other destination indication. In some embodiments, the label 108 may be printed directly on the package 104, while in other embodiments, the label 108 may be printed separately and adhered or otherwise attached to the package 104. The label 108 may include a designation of a shipping method and/or a shipping carrier.

The label 108 may include a smart electronic tracking tag (also referred to herein as "smart tag") 112. In some embodiments, the smart tag 112 may not be a part of the label 108 and may be separate. The smart tag 112 may include a transceiver 114, a battery 116, one or more sensor(s) 118, and a transmission profile 120, which may be stored on a memory device. The smart tag 112 may be configured to be adhered or otherwise attached to the package 104, and, in some embodiments, may be coupled to the label 108 (e.g., if the label is printed).

The smart tag 112 may be configured to generate package information and to send the package information via a wireless network. The package information may include information determined based at least in part on output from the one or more sensor(s) 118. For example, the package information may include inertial data representative of drops or shocks that may indicate potential package damage, temperature and/or humidity data, location data, and other information. In some embodiments, location data may not be determined by the smart tag 112, but may be determined by a remote server or other computer system based at least in part on triangulation, trilateration, or fingerprints of signals received from the smart tag 112.

The smart tag 112 may generate and/or send package information based at least in part on the transmission profile 120. The transmission profile 120 may indicate and/or instruct the smart tag 112 a frequency at which to generate and/or send package information. The transmission profile 120 may include a number of frequencies based at least in part on an estimated shipping timeline or schedule of the package and/or the product category of the item 102. For example, while the package is at a loading dock, the transmission frequency may be relatively low, and while the package is nearing a destination, the frequency may be relatively high. The transmission profile 120 may therefore regulate and/or control the frequency at which package information is sent by the smart tag 112. The transmission profile 120 may instruct or allow the smart tag 112 to enter a sleep mode or to power off in between data transmissions, thereby extending a lifetime of the battery 116. The transmission profile 120 may also determine what package information is to be sent by the smart tag 112, in some embodiments. For example, if the package is a high-value package, the transmission profile 120 may include inertial data representing package drops or shocks as package information that is to be collected and/or sent by the smart tag 112.

The transmission profile 120 may be determined by a computer system and may be specific to the package 104. The transmission profile 120 may be based at least in part on the product category of the item 102 that is being shipped, an estimated shipping timeline for the package 104, a shipping method of the package 104, and estimated arrival time of the package, or other metrics.

Figure 4:
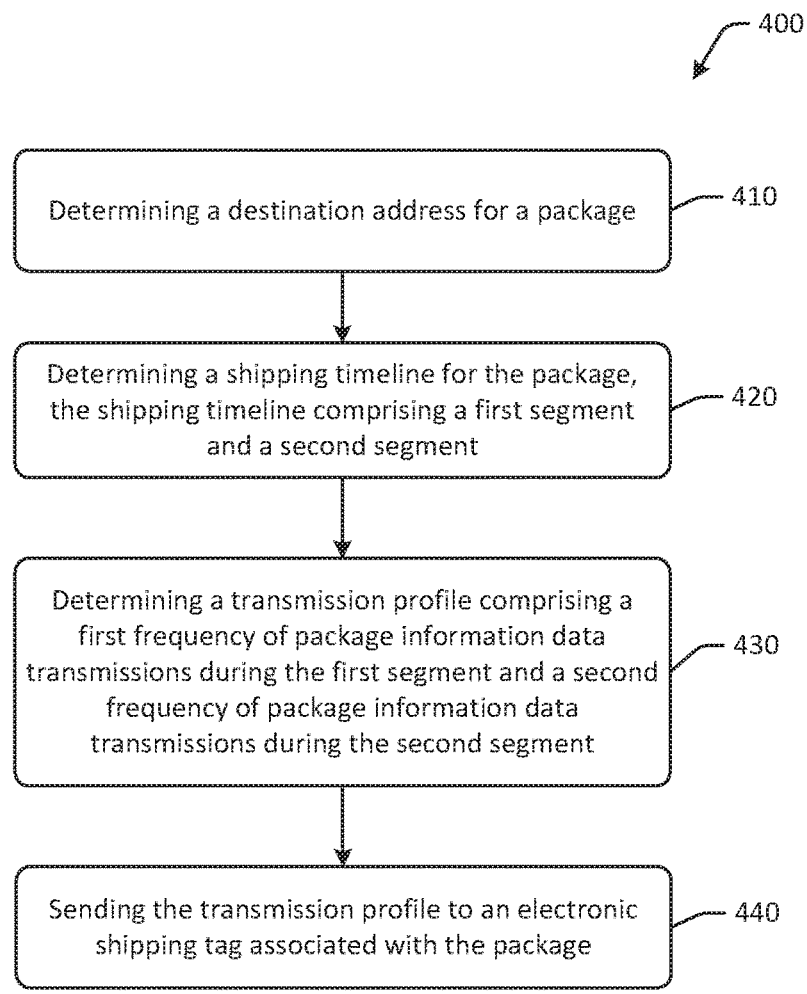
FIG. 4 is a process flow diagram of an illustrative method for optimizing power consumption for smart electronic tracking tags in accordance with one or more example embodiments of the disclosure.

In FIG. 1, an example estimated shipping timeline 110 is depicted for the package 104. The estimated shipping timeline 110 may include one or more segments. For example, a first segment 130 may include the package 104 at a loading dock waiting to be loaded on a truck or other means of transportation, such as plane transportation, ground or vehicle transportation, ship transportation, messenger or courier transportation, or other transportation. In an example of the first segment 130, the package 104 may be in a queue with other packages to be loaded onto a shipping trailer for transportation to another location. A second segment 140 may include transit, for example, where the package is en route from an origin to another destination. In the example of FIG. 1, the second segment 140 may include transit in a metal shipping trailer. A third segment 150 may be last mile delivery, where the package is being moved from a final delivery station (e.g., local post office, etc.) to a final destination. For example, in FIG. 1, the third segment 150 may include loading of the package 104 onto a local delivery vehicle, and manual transport from the local delivery vehicle to the final destination, which may be the customer's house. A fourth segment 160 may be while the package 104 has arrived at its final destination and is awaiting customer pickup and/or opening of the package. In FIG. 4, the package 104 may be positioned outside the customer's front door awaiting pickup. Other estimated shipping timelines may include additional or fewer, or different, segments.

One or more of the segments of the estimated shipping timeline 110 may be associated with a respective length of time, or, in some embodiments, a respective timeframe. For example, the first segment 130 may be associated with a length of time of 1 hour 43 minutes. In another example, the first segment 130 may be associated with a timeframe of 1:00 pm-2:43 pm. In this example, if the current time is 1:00 pm, and the length of time the package 104 is estimated to be at the loading dock is 1 hour 43 minutes, the first segment 130 may be estimated to be at the loading dock until 2:43 pm. The estimated length of time for one or more segments of the estimated shipping timeline 110 may be based at least in part on historical data, such as data collected for previous shipments, which may include all shipments from the origin facility, or may include previous shipments to a geographical area near the destination location for the package 104. For example, to determine an estimated length of time for the first segment 130, embodiments of the disclosure may analyze previous shipment data for all packages leaving the facility, whereas to estimate a length of time in the second segment, embodiments of the disclosure may analyze previous shipments that followed a similar geographical path and/or methods of transportation.

The estimated shipping timeline 110 may be an estimated shipping timeline specific to the package 104, and may be determined based at least in part on an origin address of the package 104 and/or the destination address for the package 104. The origin address may be an address or other identifier of the location from which the package 104 is being shipped. The destination address may be an address or other identifier representing a final destination of the package 104. For example, the origin address may be an address of a distribution center, and the destination address may be a customer's home address. The package 104 may include one or more items, such as groceries, consumer goods, perishable foods, or the like. Certain items may not be packaged in boxes.

Embodiments of the disclosure may generate or determine a shipping plan for the package based at least in part on the origin and destination of the package 104. The shipping plan may include an expected shipping route and/or a transportation type. For example, using the origin and/or the destination of the package 104, embodiments of the disclosure may analyze historical shipping data (e.g., previous shipments to the destination address or general vicinity or geography, etc.), real-time weather and/or traffic conditions, and other data to determine a predicted shipping route for the package 104. In one example, embodiments may predict that the package 104 will travel in a shipping trailer by road from a first city to a second city before reaching a delivery station, after which the package 104 will be out for delivery.

The estimated shipping timeline 110 may be determined based at least in part on the origin and destination of the package 104. Using the origin and/or the destination of the package 104, embodiments of the disclosure may analyze historical shipping data, real-time weather and/or traffic conditions, and other data to determine a predicted shipping route or a predicted shipping plan for the package 104. For example, embodiments may predict that the package 104 will travel in a shipping trailer by road from a first city to a second city before reaching a delivery station, after which the package 104 will be at last mile delivery. Last mile delivery may refer to movement of a package or item from a final delivery station to a final destination.

The estimated shipping timeline 110 may be based at least in part on a shipping method of the package 104, as well as the product category of the item 102 in some embodiments. For example, a shipping method may be Next Day Air, Ground, Priority, or another shipping method, and a shipping carrier may be, for example, UPS®, USPS®, FedEX®, and the like. The shipping method and/or shipping carrier may be determined based at least in part on a customer selection or input. For example, if the package 104 is to be delivered within 2 hours, the estimated shipping timeline 110 may have a total length of 2 hours. In another example, if the package 104 is to be delivered within 2 days, the estimated shipping timeline 110 may have a total length of 2 days. The estimated shipping timeline 110 may be based at least in part on weather data (e.g., weather at an origin or destination, along a shipping route, etc.), traffic data, estimated holding time, or other time-variable data. In the example of FIG. 1, the first segment 130 may have an estimated length of 2 hours, the second segment 140 may have an estimated length of 15 hours, the third segment 150 may have an estimated length of 5 hours, and the fourth segment 160 may be open ended, or may not be associated with an estimated length of time.

The estimated shipping timeline 110 may be generated, in one example, by one or more remote server(s) 170. Based at least in part on the estimated shipping timeline 110, the remote server 170 may generate the transmission profile 120. For example, if it is determined that the package 104 will be in the first segment 130 at the loading dock for 2 hours, the remote server 170 may determine that the smart tag 112 should enter a sleep mode or other power conservation mode for a period of 2 hours after activation. By entering sleep mode, power consumption of the battery 116 may be reduced.

During the second segment 140, the remote server 170 may determine that the package 104 may be in a shipping trailer during some or all transit, and therefore may be unable to effectively send or receive data. For example, while the package 104 is in the shipping trailer, some data sent by the smart tag 112 may not be received by a base station 142 that is near the shipping trailer. As a result, the remote server 170 may determine that the smart tag 112 should remain in sleep mode during a portion of the second segment 140. If the total estimated length of time of the second segment 140 is 15 hours, the remote server 170 may determine that the smart tag 112 should remain in sleep mode for 13 hours, after which the package 104 may be unloaded from the shipping trailer and/or inside a distribution or sorting facility, during which the smart tag 112 may effectively send data. Accordingly, during a portion of the second segment 140, such as towards an end of the second segment 140, the transmission profile 120 may include gradually increasing a frequency of package information transmission. For example, while the package 104 is in the shipping trailer, the frequency of package information transmission may be zero, whereas when the package is unloaded near the end of the second segment 140, the frequency of package information transmission may increase to every 15 minutes, for example.

During the third segment 150, the remote server 170 may determine that the package 104 is likely to be moving (e.g., from a distribution facility to a local delivery vehicle, etc.), and may also determine that the package 104 may not be in a metal shipping container or other space where communication interference is likely. Also, tracking the package 104 during the third segment 150 may be relatively more important due to potential theft and/or misplacement, or because the customer may be actively waiting for the package delivery. Accordingly, the remote server 170 may determine that the frequency of package information transmission should increase relative to the frequency during the second segment 130. Further, because the package 104 is nearing delivery, the concern to conserve battery power or power supply is reduced, as the package will be delivered in the near future.

During the fourth segment 160, the remote server 170 may determine that the package 104 is likely to be picked up by the customer and may therefore determine that the frequency of package information transmission should be reduced while waiting for the customer. The fourth segment 160 may continue indefinitely, until the customer picks up and/or opens the package, or until the battery 116 loses charge. During the fourth segment 160, the sensor(s) 118 may enter a standby mode so as to detect movement and/or the customer picking up the package. For example, the sensor(s) 118 may determine that the package has been picked up and is being transported, such as into a house, based at least in part on a cadence or other inertial sensor output.

Upon determining the transmission profile 120, the transmission profile 120 may be sent to the smart tag 112. In one example, the transmission profile 120 may be flashed onto a memory device of the smart tag 112. The smart tag 112 may be affixed or otherwise coupled to the package 104. The smart tag 112 may be activated, for example, when the package 104 is prepared for shipment.

FIG. 1 includes a dataflow 172 illustrating communications from the smart tag 112 to the remote server 170, which may be via a local communication protocol or via one or more wireless network(s). A smart tag transmission current usage representation 194 is also illustrated in FIG. 1. Upon receiving the transmission profile 120 and/or being activated, the smart tag 112 may send an activation confirmation indication to the remote server 170 at operation 174. The activation confirmation may use a first amount of current 180. At activation, the battery level of the battery 116 may be full, or 100%.

Upon activation, the smart tag 112 may implement the transmission profile 120. Accordingly, after sending the activation confirmation 174, the smart tag 112 may enter sleep mode, which may use a minimal amount of current 182. In some embodiments, the smart tag 112 may be powered off or otherwise transmit infrequently rather than entering a sleep mode. The smart tag 112 may include an internal clock that may be synced with a current time, or an actual real-time, at the time of activation. The internal clock may draw a low amount of power from the battery. In embodiments where the smart tag 112 includes an internal clock, the estimated lengths of time for the shipping timeline segments may be in real-time timeframes (e.g., if the current time is 3:07 pm and the first segment lasts 2 hours, the first segment may end at 5:07 pm). Using the current time, the smart tag 112 may be able to determine which segment of the estimated shipping timeline the package is in, and may identify the transmission frequency accordingly. In other embodiments, the smart tag 112 may include a counter or timer that starts at activation and may count time increments so as to determine a current segment of the estimated shipping timeline. For example, if the first segment is to last 2 hours, the counter may count 120 minutes and may then determine that the package is in the second segment.

As the package 104 nears an end of the second segment 140, as determined based on real-time, counter, or location data, the smart tag 112 may send package information to the remote server 170 at operation 176. The package information may include certain package information, which may be based on the item 102 or a product category, such as perishable, high-value, security, and the like, at a frequency determined by the transmission profile 120. In some embodiments, each transmission may include the same data, whereas in other embodiments, certain data may only be included periodically or in certain transmissions. For example, each transmission from the smart tag 112 to the remote server 170 may include inertial sensor data, while every other transmission may include temperature data. In other embodiments, each transmission may include the same or different data. As illustrated on the smart tag transmission current usage representation 194, current 184 used to send the package information may be greater than current 180 used to confirm activation, due to the potentially long distance between the smart tag 112 and a base station 142 that may receive the package information. The base station 142 may send the package information to the remote server 170. In some embodiments, local receivers may be positioned within the truck or delivery vehicle that communicate with the smart tag 112 and may relay messages from the smart tag 112 to the base station 142.

During an end portion of the second segment 140 and a beginning portion of the third segment 150, as the package approaches last mile delivery, the smart tag 112 may send package information at a first frequency 186. As the smart tag 112 begins to send the package information at the first frequency 186, the battery level of the battery 116 may be reduced to 95%.

As the package 104 is in the end stages of last mile delivery during the third segment 150, such as when a deliveryman 152 is in possession of the package in a local delivery vehicle, the smart tag 112 may send package information at a second frequency 188, which may be greater than the first frequency 186. The battery level may drop from 85% at the end of the first frequency transmission to 70%, and continue depleting while transmitting at the second frequency 188. For example, at the end of the third segment 150 as the package is approaching final destination, or at the end of the second frequency transmission interval, the battery level may be at 40%. In between package information data transmissions, the smart tag 112 may enter sleep mode to conserve battery and reduce current draw, as illustrated in the smart tag transmission current usage representation 194.

During the fourth segment 160, the smart tag 112 may send package information at a third frequency 190, which may be less than the second frequency 188. During the fourth segment 160, the sensor(s) 118 may be in a standby mode, instead of a sleep mode, so as to detect motion or movement, which may indicate that the customer has obtained the package 104. As a result, current draw 192 in between data transmissions may be higher than when the smart tag 112 is in sleep mode. The smart tag 112 may continue transmissions at the third frequency 190 until the battery level is depleted, or until the package 104 is opened.

Embodiments of the disclosure may therefore optimize power consumption by smart electronic tracking tags by managing a frequency of data transmissions so as to increase transmissions during key points or critical times along a shipping timeline, and when transmissions are likely to be received, and by decreasing a frequency of data transmissions at times that are not critical during the shipping process and/or times at which data transmissions are not likely to be received. For example, critical times may include last mile delivery, while non-critical times may include times during which a package is in a metal container or traveling on a boat across the Atlantic Ocean.

The systems, methods, computer-readable media, techniques, and methodologies for optimizing power consumption for smart electronic tracking tags may facilitate efficient communication from smart electronic tracking tags while optimizing power consumption, which may result in reduced power supply demands, increased communication efficiency, and increased operational lifetime.

Example embodiments of the disclosure provide a number of technical features or technical effects. For example, in accordance with example embodiments of the disclosure, certain smart electronic tracking tags may have longer operational times while reducing power usage and optimizing consumption of power. As a result, power sources coupled to the smart electronic tracking tags may be depleted at a slower rate, resulting in increased longevity and operational time for the smart electronic tracking tags. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2A:
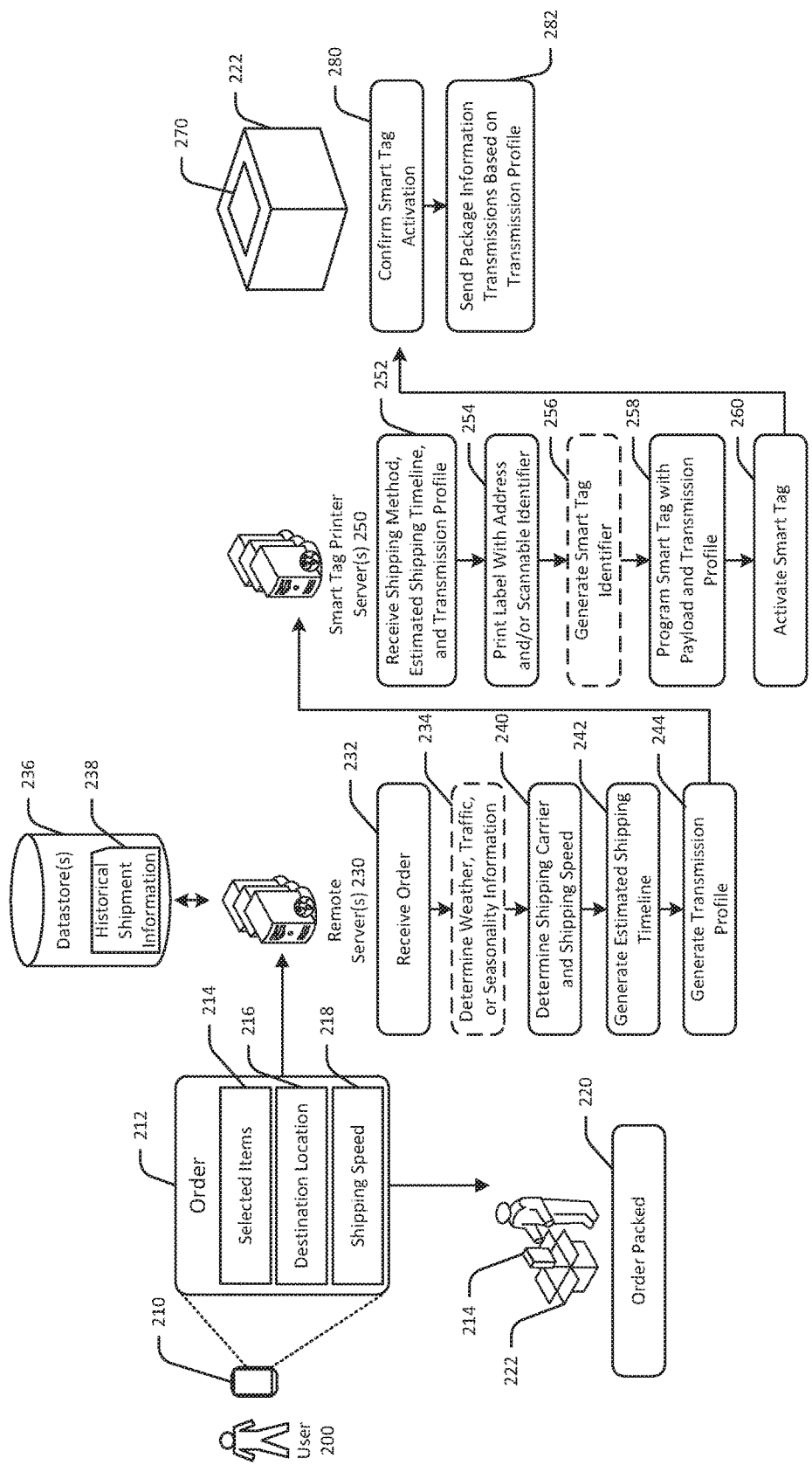
FIG. 2A is a hybrid system architecture and process flow diagram in accordance with one or more example embodiments of the disclosure.

FIG. 2A depicts a hybrid example process flow and system architecture for optimizing power consumption for smart electronic tracking tags in accordance with one or more embodiments of the disclosure. While example embodiments of the disclosure may be described in the context of smart electronic tracking tags for packages, it should be appreciated that the disclosure is more broadly applicable to any tracking device.

A user 200 may place an order 212 for a product or item with a user device 210. The user device 210 may be in communication with one or more remote server(s) 230. The order 212 may include selected items 214 that the user 200 desires, a destination, such as a delivery address or other location identifier 216, and a shipping speed 218. For example, the user 200 may order a tablet computer with a destination of the user's home address, and a delivery method of ground shipping. The order 212 may be sent to the remote server 230. After the order 212 is placed, the selected items 214 may be packed at block 220. For example, the selected items 214 may be packed in a box or package 222.

At block 232, the remote server 230 may receive the order. At block 234, computer-executable instructions of one or more module(s) stored on a memory of the remote server 230 may be executed to optionally determine weather, traffic, and/or seasonality information for the order 212 based at least in part on an origin location from where the order will be filled, the destination location 216, and an expected shipping route between the origin and destination, which may be based at least in part on the shipping speed 218 (e.g., air transport, ground transport, etc.). The weather and/or traffic information may be used to determine an estimated shipping timeline for the package 222.

The remote server 230 may be in communication with one or more datastore(s) 236. The datastore(s) 236 may include historical shipment information 238. The remote server 230 may access the datastore(s) 236 and/or otherwise use the historical shipment information 238 to determine how long it is likely to take the package 222 to be delivered to the destination. The remote server 230 may use the historical shipment information 238 for all shipments leaving the origin facility to estimate various segments of the shipping timeline, such as how long the package 222 will be at a loading dock, and may use historical shipment information 238 for packages that were shipped to a similar destination with a similar shipping method for determining estimates for other segments of the shipping timeline, such as transit time for example. In some embodiments, the remote server 230 may determine a shipping plan for the package that includes an expected route which may be determined based at least in part on historical shipment information 238. The shipping plan may include a transportation type, such as ground or air transportation.

At block 240, computer-executable instructions of one or more module(s) stored on a memory of the remote server 230 may be executed to determine a shipping carrier and/or the shipping speed. Shipping carriers may be selected from, for example, UPS®, USPS®, FEDEX®, etc. In some embodiments, the shipping carrier and/or the shipping speed may be input by the user (e.g., shipping speed 218), while in other embodiments, the shipping method may be determined by the remote server 230.

At block 242, computer-executable instructions of one or more module(s) stored on a memory of the remote server 230 may be executed to generate an estimated shipping timeline. The estimated shipping timeline may include a number of segments associated with particular timeframes and/or lengths of time. The estimated shipping timeline may be based at least in part on the origin of the package 222, the destination of the package 222, the shipping method, and/or the historical shipment information 238. In some embodiments, the estimated shipping timeline may be based on other or additional factors. The remote server 230 may determine a first estimated length of time the package will be in the first segment of the shipping timeline and a second estimated length of time the package will be in the second segment of the shipping timeline.

At block 244, computer-executable instructions of one or more module(s) stored on a memory of the remote server 230 may be executed to generate a transmission profile. The transmission profile may be generated based at least in part on the estimated shipping timeline and may indicate what data is to be sent from a smart tag. The transmission profile may indicate a frequency at which package information data is to be sent. In some embodiments, each segment of the estimated shipping timeline may be associated with one or more transmission frequencies. The transmission profile may be sent to one or more smart tag printer server(s) 250.

At block 252, the smart tag printer server 250 may receive the shipping method, the estimated shipping timeline, and the transmission profile. At block 254, the smart tag printer server 250 may print a label with a destination identifier and/or scannable barcode. At block 256, computer-executable instructions of one or more module(s) stored on a memory of the smart tag printer server 250 may be executed to optionally generate a smart tag identifier. The smart tag identifier may be unique and may be associated with the order 212 and/or the package 222.

At block 258, the smart tag printer server 250 may program a smart tag 270 with a payload and the transmission profile. At block 260, the smart tag printer server 250 may cause the smart tag 270 to be activated. The smart tag 270 may be attached to the package 222 and may confirm activation at block 280. At block 282, the smart tag 270 may send package information transmissions based on the transmission profile.

Figure 2B:
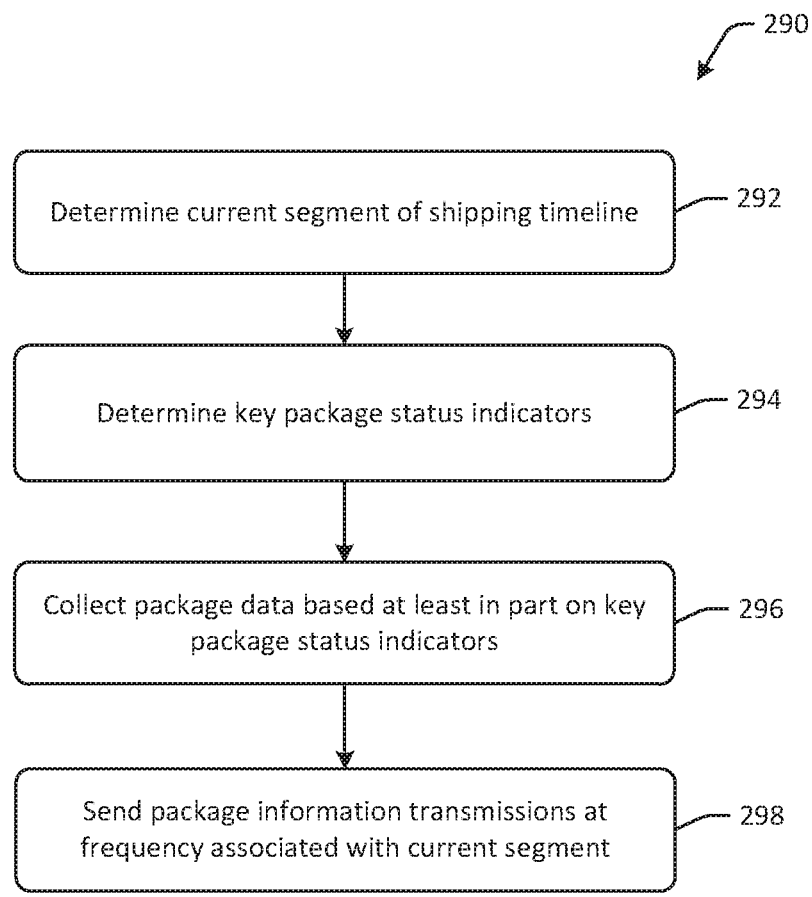
FIG. 2B is a process flow diagram in accordance with one or more example embodiments of the disclosure.

FIG. 2B depicts an example process flow 290 for sending package information in accordance with one or more example embodiments of the disclosure. As discussed at block 282 of FIG. 2A, the smart tag 270 may send package information transmissions. At block 292 of the process flow 290, the smart tag may determine a current segment of the shipping timeline. For example, the smart tag may use a real-time clock or an internal counter to determine a current segment. At block 294, the smart tag may determine key package status indicators. For example, the key package status indicators may be determined based at least in part on the transmission profile, and may include indicators such as inertial data and temperature data. At block 296, package data may be collected based at least in part on the key package status indicators. For example, temperature data may be collected using a temperature sensor. At block 298, package information transmissions may be sent at the frequency associated with the current segment. For example, if the current segment is last mile delivery, the package information transmissions may be sent relatively more frequently in some embodiments.

Figure 3:
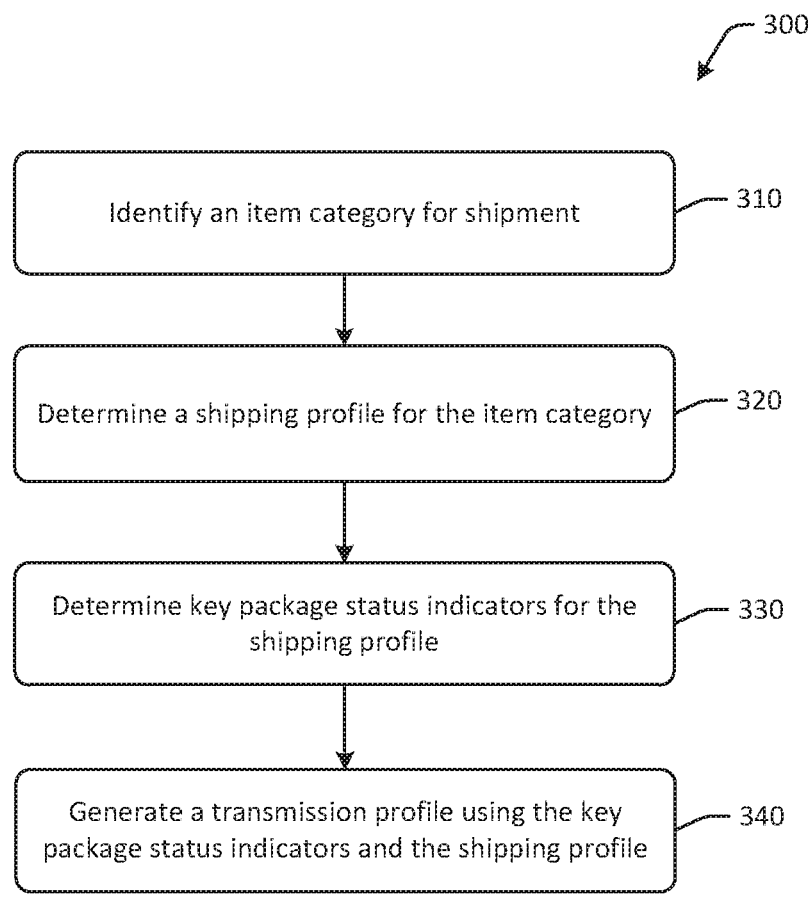
FIG. 3 is a process flow diagram of an illustrative method for generating a transmission profile in accordance with one or more example embodiments of the disclosure.

FIG. 3 depicts an example process flow 300 for generating a transmission profile in accordance with one or more example embodiments of the disclosure. Block 310 includes identifying an item category for shipment. For example, an item that is to be shipped may be associated with an item category or product category, such as a food or perishable product category, a time-sensitive product category, a non-perishable product category, a high-value or high-security product category, and the like. An item category or product category may be associated with a product or item. In some embodiments, an item category or product category may be modified based at least in part on a shipping method. For example, if a customer selects a rush shipping option, such as 1 hour delivery, for a consumer good that may not be perishable (e.g., toothpaste, etc.), the product category may be time-sensitive, even though the product is not perishable. Similarly, if a customer selects an insurance option for a product that may not be a high-value product, the order and/or product may be designated as a high-value product for that particular shipment. For security profiles, if the package information indicates that a package is being moved away from the customer's house after delivery, it may be an indication the package has been stolen.

Block 320 of the process flow 300 includes determining a shipping profile for the item category. For example, if the item category is a perishable product category, the shipping profile may be a perishable shipping profile. Block 330 of the process flow 300 includes determining key package status indicators for the shipping profile. Each shipping profile may be associated with one or more key package status indictors. Key package status indicators may be indicators or metrics that may be important in determining a status of a package. For example, for a time-sensitive shipping profile, key package status indicators may be location and/or speed of travel. In another example, for a fragile shipping profile, key package status indicators may include inertial sensor data such as drops, spills, or other sudden acceleration or deceleration events. Another example of key package information data metrics may be location data, temperature data, and inertial data for perishable products.

Block 340 of the process flow 300 includes generating a transmission profile using the key package status indicators and the shipping profile. The shipping profile may be used to determine a frequency of package information transmissions. For example, if the package is associated with a time-sensitive or 1 hour delivery shipping profile, package data transmissions may be relatively frequent because the battery may not have to last longer than 1 hour. The transmission profile may include the frequency of transmission for various segments of the estimated shipping timeline, and may also include the key package status indicators. The key package status indicators may be used by smart tags to determine what package information is to be sent and when particular information is to be sent by the smart tag.

FIG. 4 depicts an example process flow 400 for optimizing power consumption for smart electronic tracking tags in accordance with one or more example embodiments of the disclosure. Block 410 of the process flow 400 includes determining a destination address for a package. For example, a destination address may be input by a customer at the time an order is placed. Block 420 includes determining a shipping timeline for the package, where the shipping timeline includes a first segment and a second segment. For example, the shipping timeline may include a transit segment and a last mile delivery segment. One or more of the segments may be associated with real-time timeframes or lengths of time. Block 430 includes determining a transmission profile including a first frequency of package information data transmissions during the first segment and a second frequency of package information data transmissions during the second segment. The first frequency may be greater than, less than, or equal to the second frequency. In some embodiments, the segments may be associated with more than one frequency. Block 440 includes sending the transmission profile to an electronic shipping tag associated with the package. For example, the transmission profile may be flashed on a memory of the electronic shipping tag. In some embodiments, transmission profiles may be sent to electronic shipping tags while the electronic shipping tags are in active transit. For example, if a package is delayed, an updated transmission profile may be sent to an electronic shipping tag reflecting the delay and/or an updated delivery time.

Figure 5:
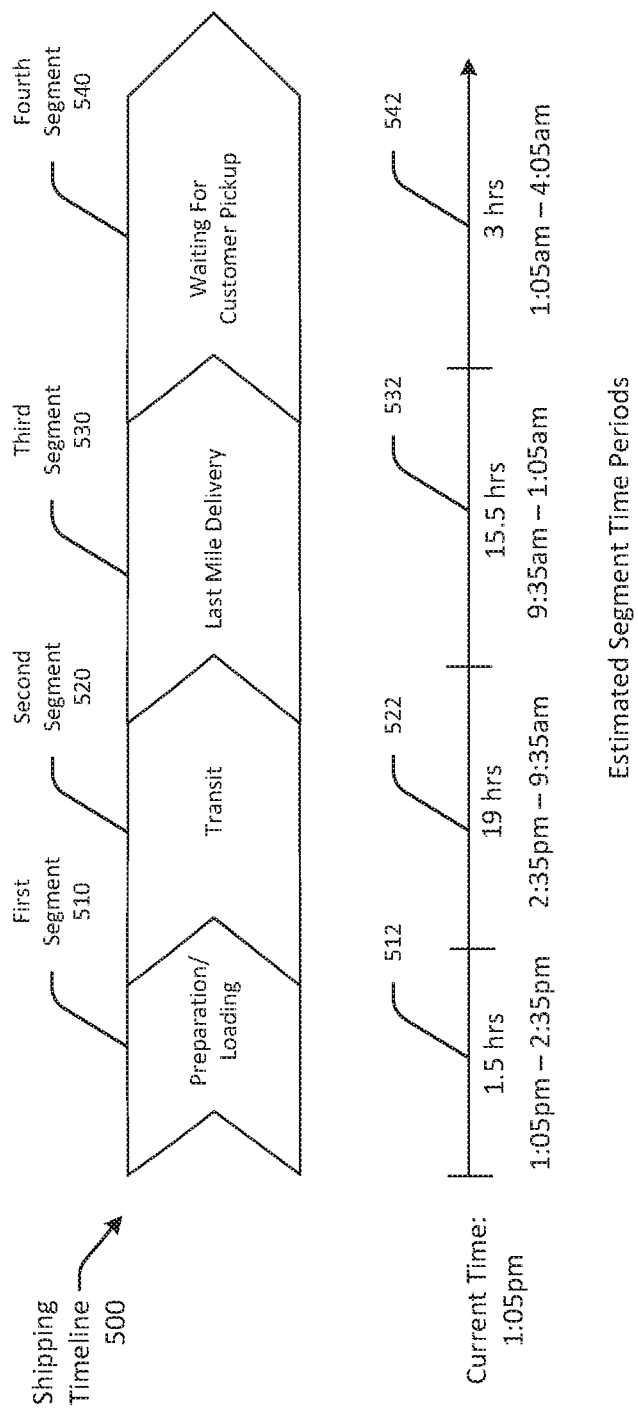
FIG. 5 is a schematic illustration of an example shipping timeline in accordance with one or more example embodiments of the disclosure.

Referring to FIG. 5, an example shipping timeline 500 is depicted in accordance with one or more embodiments of the disclosure. The shipping timeline 500 may include one or more segments. For example, the shipping timeline 500 may include a first segment 510 that may be include preparation of a package, such as packing, and loading the package at initial transport. The first segment 510 may be associated with a length of time. For example, the first segment 510 may be associated with an estimated segment time period 512 of 1.5 hours. In some embodiments, the first segment may be associated with a real-time timeframe. For example, a current time may be 1:05 pm. Because the first segment 510 is estimated to be 1.5 hours, the first segment 510 may be estimated to end at 2:35 pm.

The shipping timeline 500 may include a second segment 520. The second segment 520 may be a transit segment during which the package will be in transit from the origin. The second segment 520 may be associated with an estimated segment time period 522 of 19 hours and/or a real-time timeframe of 2:35 pm-9:35 am the following day. The shipping timeline 500 may include a third segment 530. The third segment 530 may be a last mile delivery segment during which the package may be within a predetermined distance from a destination or within a predetermined length of time to delivery. For example, last mile delivery may occur when the package is within 1 hour of a scheduled delivery time. The third segment 530 may be associated with an estimated segment time period 532 of 15.5 hours and/or a real-time timeframe of 9:35 am-1:05 am the following day. The shipping timeline 500 may include a fourth segment 540. The fourth segment 540 may be a waiting for customer pickup segment during which the package may be at the destination waiting for the customer to retrieve and/or open the package. The fourth segment 540 may not be associated with any time and may be indefinite, or may be associated with an estimated segment time period 542 of 3 hours and/or a real-time timeframe of 1:05 am-4:05 am.

The shipping timeline 500 may be used by a smart electronic tracking tag to determine a present segment, and to determine a transmission frequency at which package information is to be sent that is associated with the present segment. For example, a counter may be initiated at the smart electronic tracking tag when the tag is activated. The counter may be configured to increment time. As time passes, the counter output may be used to determine an end of the first segment 510 and/or a beginning of the second segment 520 (e.g., 90 minutes after the tag is activated, etc.).

In another example, the smart tag may use an internal clock to determine a present segment. For example, at activation, the internal clock may be synced with a current time. The current time may be used to determine a present segment. For example, at 3:00 pm, the smart tag may determine that the second segment 520 is the present segment, and may send package information data transmissions accordingly.

Figure 6:
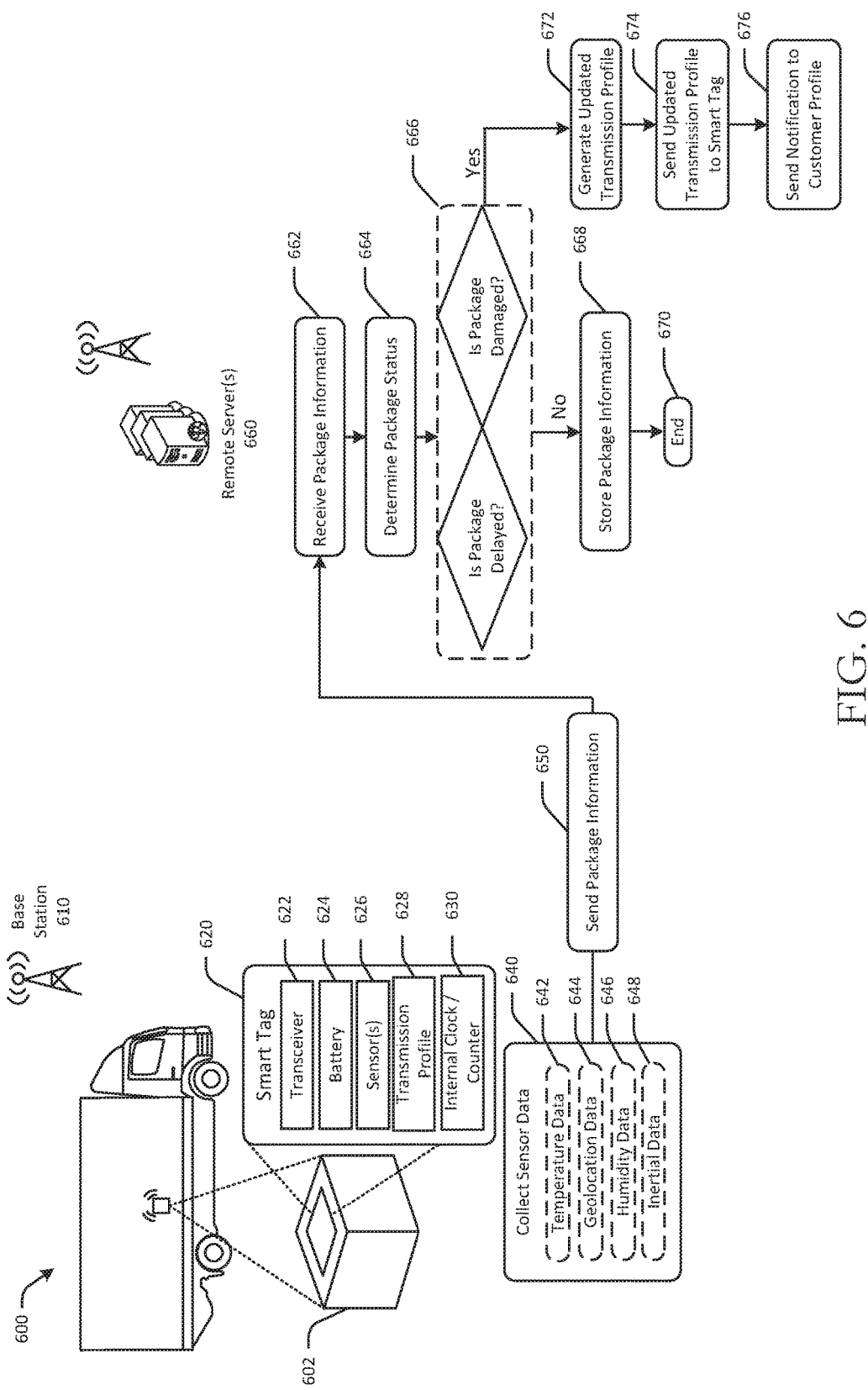
FIG. 6 is a hybrid system and process flow diagram illustrating smart electronic tracking tag functionality and system functionality in accordance with one or more example embodiments of the disclosure.

FIG. 6 depicts a hybrid system and process flow diagram illustrating smart electronic tracking tag functionality and system functionality in accordance with one or more example embodiments of the disclosure. In the example of FIG. 6, a package 602 may be in transit in a shipping trailer 600. The shipping trailer 600 may be within range of a base station 610. The package 602 may have a smart tag 620 attached to the package 602. The smart tag 620 may include a transceiver 622, a battery 624, one or more sensor(s) 626, a transmission profile 628 that may be stored on a memory device, and an internal clock and/or counter 630.

The smart tag 620 may be configured to collect package information and to send the package information via the base station 602. Certain package information may be collected by collecting sensor data at block 640. For example, the smart tag 620 may collect temperature data 642 using a temperature sensor, geolocation data 644 using available WiFi access point information, triangulation or trilateration techniques, fingerprint methods, GPS data, or another method, humidity data 646 using a humidity sensor, and/or inertial data 648 using an inertial sensor. In some embodiments, the inertial sensor may be a part of the smart tag 620, while in other embodiments, the inertial sensor may be positioned elsewhere within or on the package. Other types of data using the same or other sensors may be collected or measured.

At block 650, the smart tag 620 may send package information to one or more remote server(s) 660 via the base station 610. At block 662, the remote server(s) 660 may receive the package information. At block 664 the remote server(s) 660 may determine a package status for the package 602. For example, at optional determination blocks 666, the remote server(s) 660 may determine whether the package information indicates the package 602 has suffered drops and/or intense acceleration, deceleration, or shock events that may indicate damage. The remote server(s) 660 may optionally determine whether the package information indicates that the package is not at an expected location at the time the package information is received or whether the package is behind schedule.

If it is determined that the package is not delayed and/or damaged at determination block 666, the process flow may proceed to block 668, at which the package information is stored as historical shipment data. The process flow ends at block 670.

If it is determined that the package is delayed and/or damaged at determination block 666, the process flow may proceed to block 672, at which the remote server(s) 660 may generate an updated transmission profile. For example, if the package is delayed in transit an estimated 2 hours, the updated transmission profile may increase the length of time associated with a transit segment by 2 hours, and the smart tag may send package information at the appropriate frequency using the updated transmission profile. In another example, the remote server(s) 660 may compare a present location of the smart tag to an expected location and determine whether the present location exceeds a threshold tolerance or threshold distance of the expected location. At block 674, the remote server(s) 660 may send the updated transmission profile to the smart tag. At block 676, the remote server(s) 660 may send a notification to a customer profile associated with a customer for whom the package is intended. The notification may indicate that the package is delayed and/or damaged.

Figure 7:
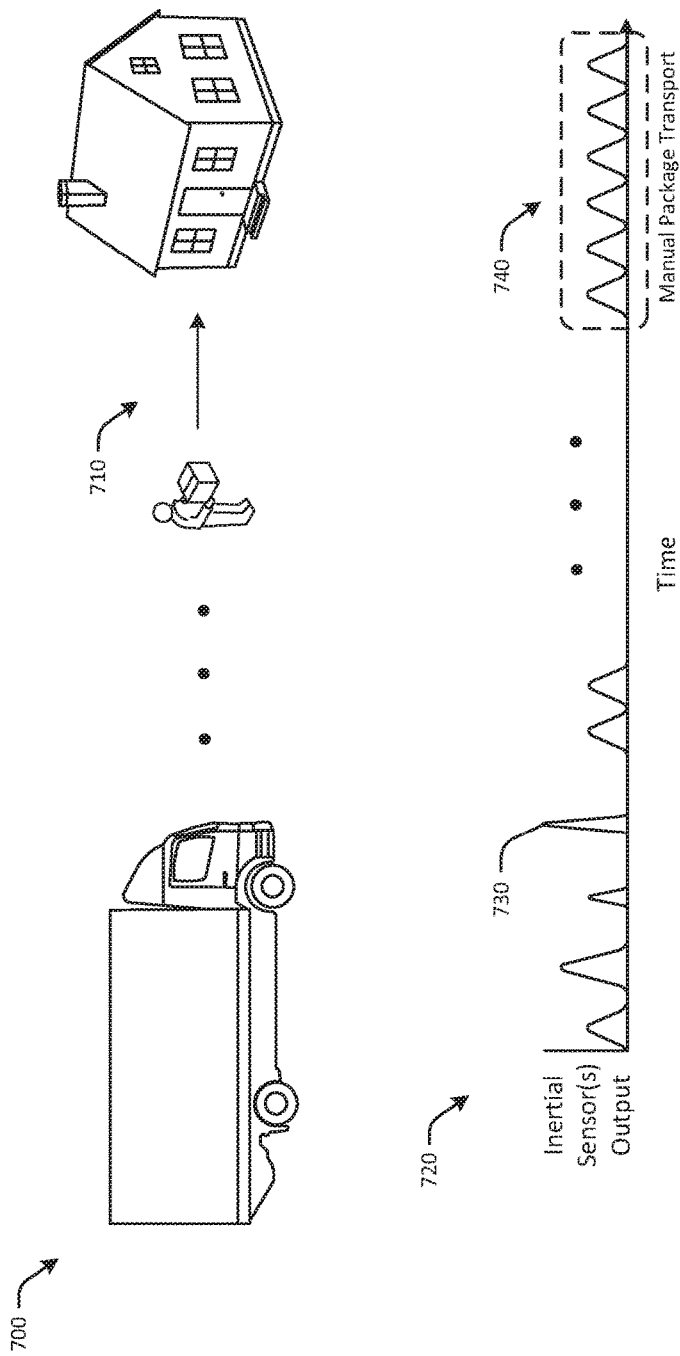
FIG. 7 is a schematic illustration of an example inertial sensor output in accordance with one or more example embodiments of the disclosure.

Referring to FIG. 7, an example of sensor data is depicted in accordance with one or more embodiments of the disclosure. A package may be in a trailer during transit 700. During transit, an inertial sensor may be activated based at least in part on a transmission profile to collect data. An example inertial sensor output 720 illustrates inertial sensor output over time. While the package is in transit 700, the package may experience changes in inertia that may be captured by an inertial sensor. Inertial data may indicate package drops or other status. For example, a peak 730 may indicate a sharp change in inertia that may correspond to trauma. For sensitive packages, peaks may indicate that the package is likely to be damaged. As the package is being delivered 710, the inertial sensor output 740 may have a rhythmic or period form that may match a cadence of a human gait. Such output may indicate that the package is being manually transported from one place to another. The inertial sensor associated with the electronic shipping tag to enter a standby mode. Inertial data may also be used to determine whether the smart tag is moving at an expected speed. Based at least in part on inertial data, the smart tag may adjust transmission frequency.

One or more operations of the method, process flows, or use cases of FIGS. 1-7 may have been described above as being performed by a smart tag, or more specifically, by one or more program modules, applications, or the like executing on a device. It should be appreciated, however, that any of the operations of methods, process flows, or use cases of FIGS. 1-7 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired, or in the order as described, in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 8:
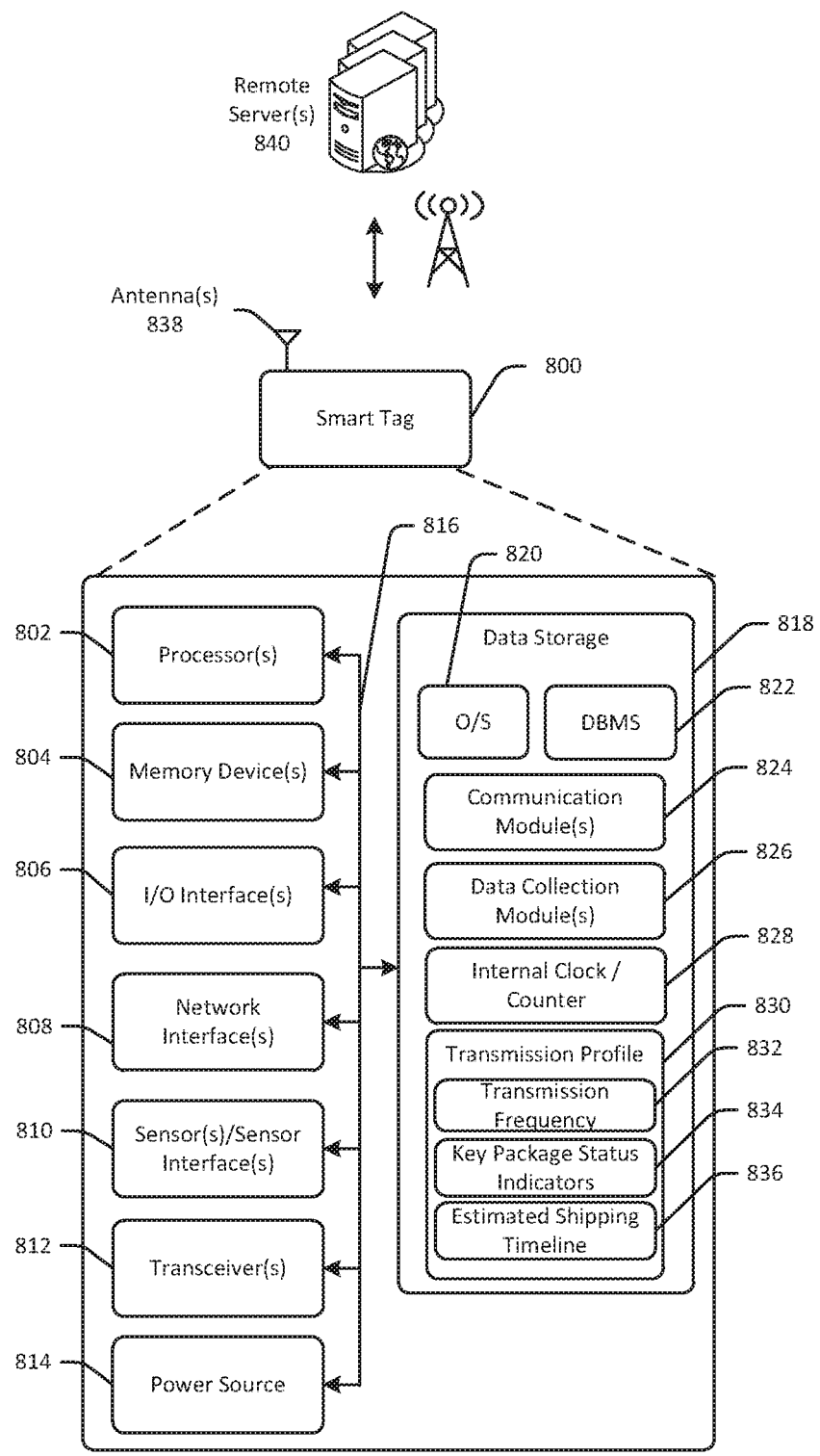
FIG. 8 is a schematic block diagram of an illustrative smart electronic tracking tag in accordance with one or more example embodiments of the disclosure.

FIG. 8 is a schematic block diagram of an illustrative smart tag 800 in accordance with one or more example embodiments of the disclosure. The smart tag 800 may include any suitable computing device including, but not limited to, a mobile device such as a smartphone, tablet, e-reader, wearable device, or the like; a desktop computer; a laptop computer; a content streaming device; a set-top box; or the like. The smart tag 800 may correspond to an illustrative device configuration for the electronic tracking tags of FIGS. 1-7.

The smart tag 800 may be configured to communicate via one or more networks (not shown), such as an Internet of Things network, with one or more servers, user devices, or the like. For example, in the illustration of FIG. 8, the smart tag 800 may be configured to communicate with one or more remote server(s) 840.

The smart tag 800 may be configured to communicate via one or more networks. Such network(s) may include, but are not limited to, any one or more different types of communications networks such as, for example, Internet of Things networks, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the smart tag 800 may include one or more processors (processor(s)) 802, one or more memory devices 804 (generically referred to herein as memory 804), one or more input/output ("I/O") interface(s) 806, one or more network interface(s) 808, one or more sensors or sensor interface(s) 810, one or more transceiver(s) 812, one or more power source(s) 814, and data storage 818. The smart tag 800 may further include one or more buse(s) 816 that functionally couple various components of the smart tag 800. The smart tag 800 may further include one or more antennas 838 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 816 may include at least one of a system bus, a memory bus, an address bus, or a message bus, and may permit exchange of information (e.g., data (including computer-executable code), signaling, etc.) between various components of the smart tag 800. The bus(es) 816 may include, without limitation, a memory bus or a memory controller, a peripheral bus, an accelerated graphics port, and so forth. The bus(es) 816 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the smart tag 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 818 may include removable storage and/or non-removable storage including, but not limited to, magnetic storage, optical disk storage, and/or tape storage. The data storage 818 may provide non-volatile storage of computer-executable instructions and other data. The memory 804 and the data storage 818, removable and/or non-removable, are examples of computer-readable storage media (CRSM) as that term is used herein.

The data storage 818 may store computer-executable code, instructions, or the like that may be loadable into the memory 804 and executable by the processor(s) 802 to cause the processor(s) 802 to perform or initiate various operations. The data storage 818 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 818 for non-volatile storage.

More specifically, the data storage 818 may store one or more operating systems (O/S) 820, one or more database management systems (DBMS) 822, and one or more program modules, applications, engines, computer-executable code, scripts, or the like such as, for example, one or more communication module(s) 824, one or more data collection module(s) 826, one or more internal clock(s) and/or counter(s) 828, and one or more transmission profile(s) 830. Some or all of these modules may be sub-modules. Any of the components depicted as being stored in data storage 818 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 818 may support functionality described in reference to correspondingly named components earlier in this disclosure.

The data storage 818 may further store various types of data utilized by components of the smart tag 800. Any data stored in the data storage 818 may be loaded into the memory 804 for use by the processor(s) 802 in executing computer-executable code. In addition, any data depicted as being stored in the data storage 818 may potentially be stored in one or more datastore(s) (not shown) and may be accessed via the DBMS 822 and loaded in the memory 804 for use by the processor(s) 802 in executing computer-executable code. The datastore(s) may include, but are not limited to, databases (e.g., relational, object-oriented, etc.), file systems, flat files, distributed datastore(s) in which data is stored on more than one node of a computer network, peer-to-peer network datastore(s), or the like.

The processor(s) 802 may be configured to access the memory 804 and execute computer-executable instructions loaded therein. For example, the processor(s) 802 may be configured to execute computer-executable instructions of the various program modules, applications, engines, or the like of the smart tag 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program modules depicted in FIG. 8, the communication module(s) 824 may include computer-executable instructions, code, or the like that responsive to execution by one or more of the processor(s) 802 may perform functions including, but not limited to, sending and/or receiving information, such as sending package information or receiving transmission profiles.

The data collection module(s) 826 may include computer-executable instructions, code, or the like that responsive to execution by one or more of the processor(s) 802 may perform functions including, but not limited to, collecting measurements or output of one or more sensors.

The internal clock(s) and/or counter(s) 828 may include computer-executable instructions, code, or the like that responsive to execution by one or more of the processor(s) 802 may perform functions including, but not limited to, tracking a current time or a length of elapsed time.

The transmission profile(s) 830 may include computer-executable instructions, code, or the like that responsive to execution by one or more of the processor(s) 802 may perform functions including, but not limited to, determining a current shipping timeline segment and determining a transmission frequency for package information. The transmission profile 830 may include a transmission frequency 832, key package status indicators 834, and an estimated shipping timeline 836.

Referring now to other illustrative components depicted as being stored in the data storage 818, the O/S 820 may be loaded from the data storage 818 into the memory 804 and may provide an interface between other application software executing on the smart tag 800 and hardware resources of the smart tag 800. More specifically, the O/S 820 may include a set of computer-executable instructions for managing hardware resources of the smart tag 800 and for providing common services to other application programs (e.g., managing memory allocation among various application programs). In certain example embodiments, the O/S 820 may control execution of one or more of the program modules depicted as being stored in the data storage 818. The O/S 820 may include any operating system now known or which may be developed in the future including, but not limited to, any server operating system, any mainframe operating system, or any other proprietary or non-proprietary operating system.

The DBMS 822 may be loaded into the memory 804 and may support functionality for accessing, retrieving, storing, and/or manipulating data stored in the memory 804 and/or data stored in the data storage 818. The DBMS 822 may use any of a variety of database models (e.g., relational model, object model, etc.) and may support any of a variety of query languages. The DBMS 822 may access data represented in one or more data schemas and stored in any suitable data repository. In certain example embodiments, the DBMS 822 may be any suitable light-weight DBMS optimized for performance on a mobile device.

Referring now to other illustrative components of the smart tag 800, the input/output (I/O) interface(s) 806 may facilitate the receipt of input information by the smart tag 800 from one or more I/O devices as well as the output of information from the smart tag 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the smart tag 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 838 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The smart tag 800 may further include one or more network interface(s) 808 via which the smart tag 800 may communicate with any of a variety of other systems, platforms, networks, devices, and so forth. The network interface(s) 808 may enable communication, for example, with a wireless router, a host server, and/or one or more web servers via one or more network(s).

The antenna(s) 838 may include any suitable type of antenna depending, for example, on the communications protocols used to transmit or receive signals via the antenna(s) 838. Non-limiting examples of suitable antennas may include directional antennas, non-directional antennas, dipole antennas, folded dipole antennas, patch antennas, multiple-input multiple-output (MIMO) antennas, or the like. The antenna(s) 838 may be communicatively coupled to one or more transceivers 812 or radio components to which or from which signals may be transmitted or received.

As previously described, the antenna(s) 838 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 838 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 838 may be configured to transmit or receive radio frequency signals within any suitable frequency range forming part of the unlicensed portion of the radio spectrum.

The antenna(s) 838 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 838—transmitting or receiving radio frequency (RF) signals in the bandwidth and/or channels corresponding to the communications protocols utilized by the smart tag 800 to communicate with other devices. The transceiver(s) 812 may include hardware, software, and/or firmware for modulating, transmitting, or receiving—potentially in cooperation with any of antenna(s) 838—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the smart tag 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, temperature sensors, humidity sensors, location sensors, and so forth. Example types of inertial sensors may include accelerometers (e.g., MEMS-based accelerometers), gyroscopes, and so forth.

The power source 814 may be configured to provide energy or otherwise power the smart tag 800. The power source 814 may be any suitable type of source or battery including, but not limited to, wet cells, dry cells, lead-acid, lithium, lithium hydride, lithium ion, or the like, at any suitable voltage and/or output current. In certain embodiments, the power source 814 may be rechargeable. The power source 814 may be configured to receive and store energy, and to power the smart tag 800.

It should be appreciated that the program modules, applications, computer-executable instructions, code, or the like depicted in FIG. 8 as being stored in the data storage 818 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the smart tag 800, and/or hosted on other computing device(s) accessible via one or more networks, may be provided to support functionality provided by the program modules, applications, or computer-executable code depicted in FIG. 8 and/or additional or alternate functionality. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 8 may be implemented, at least partially, in hardware and/or firmware across any number of devices.

It should further be appreciated that the smart tag 800 may include alternate and/or additional hardware, software, or firmware components beyond those described or depicted without departing from the scope of the disclosure. More particularly, it should be appreciated that software, firmware, or hardware components depicted as forming part of the smart tag 800 are merely illustrative and that some components may not be present or additional components may be provided in various embodiments. While various illustrative program modules have been depicted and described as software modules stored in data storage 818, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods, process flows, and use cases of FIGS. 1-7 may be performed by a device having the illustrative configuration depicted in FIG. 8, or more specifically, by one or more engines, program modules, applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
    determining, by one or more computer processors coupled to at least one memory, an origin address for a package, wherein the package comprises a radio frequency identification (RFID) tag;
    determining a destination address for the package;
    determining a shipping plan for the package, the shipping plan comprising an expected route and a transportation type;
    determining key package status metrics for the package, wherein the key package status metrics comprise one or more of: temperature data, location data, or inertial data;
    determining a shipping timeline for the package using the shipping plan, the shipping timeline comprising a first segment, a second segment, a third segment, and a fourth segment;
    determining a first time interval at which to cause the RFID to broadcast the key package status metrics during the first segment, wherein the first segment comprises a first estimated length of time prior to the package leaving a fulfillment center (FC) location;
    determining a second time interval during which to cause the RFID tag to enter a sleep mode during the second segment, wherein the second segment comprises a second estimated length of time during which the package is in transit from the FC location to a predetermined distance from the destination address;

determining a third time interval at which to cause the RFID to broadcast the key package status metrics during the third segment, wherein the third segment comprises a third estimated length of time during which the package is within the predetermined distance;

determining a fourth time interval at which to cause the RFID to broadcast the key package status metrics during the fourth segment, the fourth segment corresponding to a fourth time duration during which the package is in unopened state at the destination address; and generating a transmission profile for the package, the transmission profile comprising transmission instructions for the first time interval, the second time interval, the third time interval, and the fourth time interval, wherein the transmission profile is stored on the RFID tag prior to attaching the RFID tag to the package.

2. The method of claim 1, wherein generating the transmission profile for the package comprises:
determining a current time;
determining a first end time for the first time interval by adding the first estimated length of time to the current time;
determining a second end time for the second time interval by adding the second estimated length of time to the first end time; and
determining a third end time for the third time interval by adding the third estimated length of time to the second end time;
wherein the RFID tag uses an internal clock to determine a current segment of the shipping timeline.

3. The method of claim 1, wherein the transmission profile is a first transmission profile, the method further comprising:
receiving first location data for the package;
determining, based on the first location data, that the package is not within the predetermined distance of the destination address;
determining that the first estimated length of time and the second estimated length of time have elapsed;
determining a fourth estimated length of time after which the package will be within the predetermined distance of the destination address based on the first location data; and
sending the second transmission profile to the RFID tag.

4. A method comprising:
determining, by one or more computer processors coupled to at least one memory, a destination address for a package;
determining a shipping timeline for the package, the shipping timeline comprising a first segment, and a second segment, and a third segment;
determining a transmission profile comprising a first frequency of package information data transmissions during the first segment, and a second frequency of package information data transmissions during the second segment, and a third frequency of package information data transmissions during the third segment;
sending the transmission profile to an electronic shipping tag associated with the package;
receiving location data from the electronic shipping tag;
determining that the package has been delivered, wherein the third segment corresponds to a length of time during which the package is in an unopened state at the destination address; and
activating an inertial sensor associated with the electronic shipping tag to a standby mode.

5. The method of claim 4, further comprising;
determining a first estimated length of time the package will be in the first segment, wherein the first segment corresponds to a first time duration during which the package is in transit to a predetermined distance from the destination address;
determining a second estimated length of time the package will be in the second segment, wherein the second segment corresponds to a second time duration during which the package is within the predetermined distance;
determining a current time; and
programming the electronic shipping tag with the transmission profile and the current time.

6. The method of claim 4, wherein the first segment corresponds to a first duration of time during which the package is in transit to a predetermined distance from the destination address, and the first frequency of package information data transmissions is one transmission per hour.

7. The method of claim 6, wherein the second segment corresponds to a second duration of time during which the package is within the predetermined distance from the destination address, and the second frequency of package information data transmissions is greater than zero.

8. The method of claim 4, further comprising:
determining an estimated time of arrival for the package;
receiving location data from the electronic shipping tag;
determining, based on the location data, that the package is delayed beyond the estimated time of arrival; and
sending a notification to a user indicating that the package is delayed.

9. The method of claim 4, further comprising:
determining a first estimated length of time for the first segment;
determining a second estimated length of time for the second segment;
activating the electronic shipping tag; and
initiating a counter at the electronic shipping tag, wherein the counter is configured to increment time.

10. The method of claim 9, wherein the transmission profile is a first transmission profile, the method further comprising:
receiving location data from the electronic shipping tag;
determining, based on the location data, that a location of the package is farther than an expected location by a threshold distance at a time of receipt of the location data;
determining a time extension to add to the second estimated length of time;
determining a second transmission profile comprising a third segment replacing the second segment, wherein the second frequency of package information data transmissions is associated with the third segment and the third segment has a third estimated length of time equal to the second estimated length of time and the time extension; and
sending the second transmission profile to the electronic shipping tag.

11. The method of claim 4, further comprising:
receiving location data from the electronic shipping tag;
determining that the package is at the destination address;
activating an inertial sensor associated with the electronic shipping tag;
receiving inertial data from the package; and determining that the inertial data indicates human cadence.

12. The method of claim 11, wherein the location data is first location data, further comprising:
receiving second location data from the electronic shipping tag;
determining that the package has moved away from the destination address; and
triggering a security alert indicating that the package has moved away from the destination address.

13. The method of claim 4, further comprising:
determining a distance between the package and the predetermined distance.

14. An electronic shipping tag comprising:
a power source;
a transceiver;
at least one sensor;
at least one memory that stores computer-executable instructions;
at least one processor configured to access the at least one memory and execute the computer-executable instructions to:
receive a transmission profile comprising a first frequency of package information data transmissions during a first segment of a shipping timeline and a second frequency of package information data transmissions during a second segment of a shipping timeline;
send package information data transmissions at a first interval corresponding to the first frequency during the first segment;
determine a first duration of the first segment;
determine that the package is in the second segment of the shipping timeline;
activate the sensor to a standby mode;
detect movement using the sensor; and
send package information data transmissions comprising movement data at a second interval corresponding to the second frequency during the second segment, wherein the second interval is shorter than the first interval.

15. The electronic shipping tag of claim 14, wherein the transmission profile further comprises a third frequency of package information data transmissions during a third segment of the shipping timeline, and wherein the at least one processor is further configured to execute the computer-executable instructions to:
determine a second duration of the second segment, wherein the second duration is shorter than the first duration;
determine that the second segment is complete; and
send package information data transmissions at a third interval corresponding to the third frequency during the third segment, wherein a third duration of the third interval is shorter than the first duration and the second duration.

16. The electronic shipping tag of claim 14, further comprising:
an internal real-time clock configured to determine a current time; and
a global positioning satellite (GPS) chip configured to generate location data;
wherein at least one processor is further configured to execute the computer-executable instructions to determine a current time using the internal real-time clock, and to determine a package location using the GPS chip.

17. The electronic shipping tag of claim 14, wherein the transmission profile is a first transmission profile, and wherein the at least one processor is further configured to execute the computer-executable instructions to:
receive a second transmission profile during the second segment, the second transmission profile comprising a third segment with a third duration that replaces the second segment; and
send package information data transmissions at the second interval for the third duration.

18. The electronic shipping tag of claim 14, wherein the at least one sensor is an inertial sensor, and the at least one processor is further configured to execute the computer-executable instructions to:
determine that the package is in the second segment of the shipping timeline based at least in part on an elapsed time;
measure inertial data; and
send package information data comprising the measured inertial data at the second frequency.

* * * * *